Sept. 14, 1965  D. H. BARON  3,205,615
HOPPING FIGURE TOY
Filed June 16, 1964
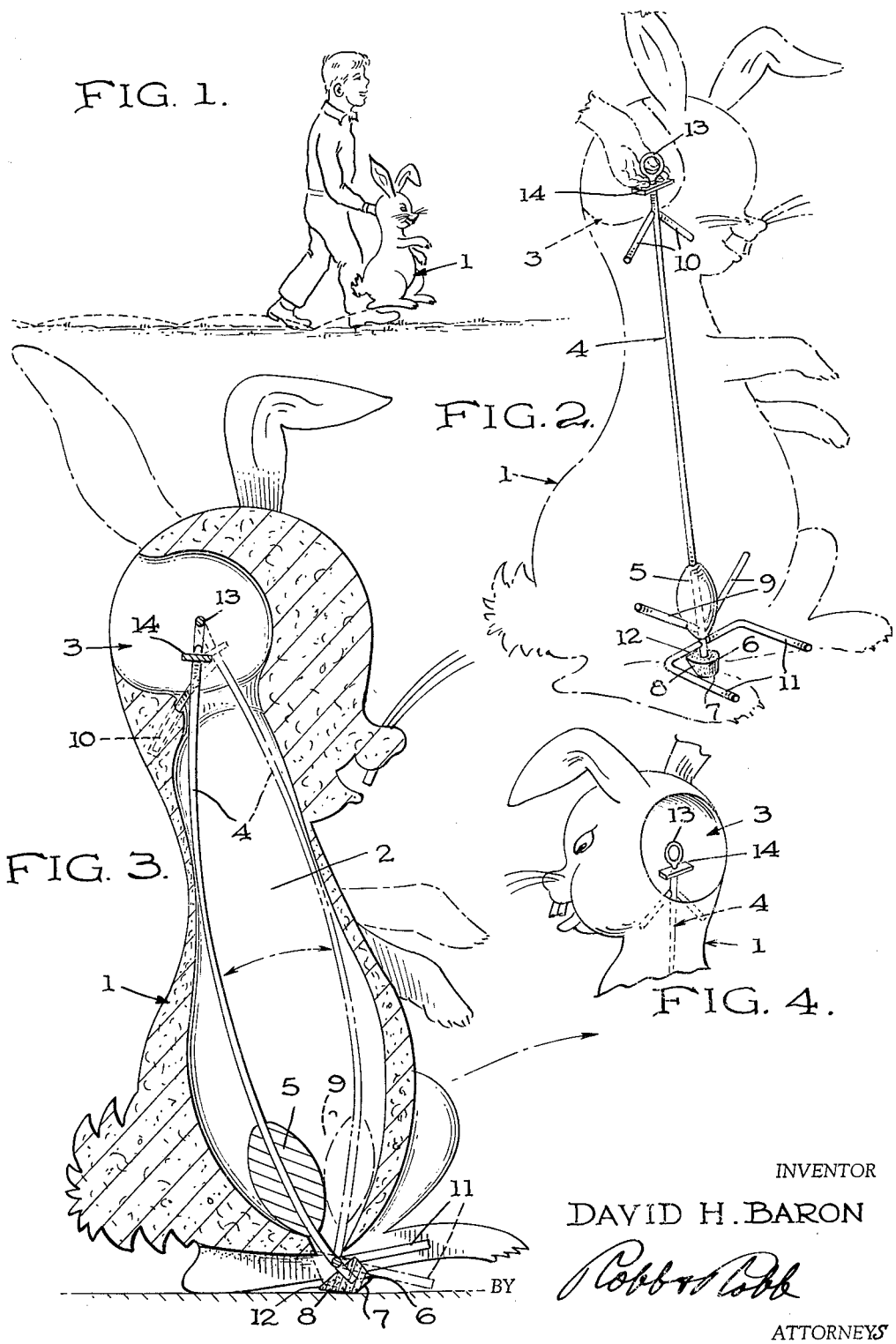
INVENTOR
DAVID H. BARON
BY Robb and Robb
ATTORNEYS United States Patent Office 3,205,615
Patented Sept. 14, 1965

3,205,615
HOPPING FIGURE TOY
David H. Baron, Ontario Ave., R.D. 1, Syracuse, N.Y.
Filed June 16, 1964, Ser. No. 375,499
12 Claims. (Cl. 46—129)

The present invention relates to animated toys, and more particularly to figure toys of the mechanical type which may be caused to jump or hop in simulation of the animal represented thereby, such as a rabbit, kangaroo, frog or the like.

The primary object of the invention is to provide an animated toy which gives amusement to children, while at the same time, will help to teach and develop coordination of movement of children's bodies and limbs, which is essential in the successful operation and control of my improved toy.

A further object of the invention is to provide a toy of the aforementioned type which is relatively simple in construction, comparatively inexpensive in its cost of manufacture, and easy and safe to operate either indoors or outdoors.

In carrying out the aforementioned objectives, I preferably utilize the principle of flexing and reflexing of a resilient vertically elongated columnar operating member, such as a normally straight length of rod or heavy wire of steel, bronze, nylon or other appropriate material having sufficient stiffness, flexibility and resilience such that when disposed in a generally upright position with its lower end engaging the ground or floor, and a downward pressure is applied to the upper end thereof and then quickly released, the rod will flex and bow in one direction and quickly reflex in the opposite direction with a resultant hopping motion tending to raise the rod upwardly off the ground or floor and at the same time propel itself in the general direction of the reflexing movement during the course of which the rod resumes its normally straight condition. Repeated applications of downward pressure on the rod in properly timed relation to its flexing and reflexing action and accompanied by movement of the operator along with the rod as it advances, will produce a continuous series of hops or jumps of the rod. Thus, when the rod is mounted within an animal simulating body figure with the upper end of the rod accessible for the application of pressure thereon by the hand, the animal figure can be caused to jump or hop in close simulation to the movements of a live animal.

Other and further objects and advantages of the invention will be hereinafter described or will become apparent from the following description and the accompanying drawings:

In the drawings:

FIG. 1 is a view in side elevation generally illustrating the operation of my animated toy invention under the control of a child operator;

FIG. 2 is an enlarged view of the operating element as seen in front perspective, with the animal figure in which it is mounted being depicted in broken outline;

FIG. 3 is a vertical sectional view through a toy according to FIGS. 1 and 2, and more particularly illustrating the mounting details of the operating element, with the operating element shown in full lines in an initially flexed condition and shown in broken lines in a subsequent reflexed condition which imparts the jumping or hopping motion to the toy; and FIG. 4 is a fragmentary rear perspective detail view of the upper portion of the toy, showing the hand-opening in the rear of the animal head, and with the thumb loop and finger cross-bar on the upper end of the operating element being exposed to view through the hand-opening aforesaid.

Like reference characters designate corresponding parts in the several figures of the drawing, wherein 1 generally denotes the body member of the toy which may be of any appropriate form, but preferably simulating an animal of the hopping or jumping type which has been shown for illustrative purposes herein as representing a rabbit. The body member 1 may be made of any suitable material, preferably of a light-weight and inexpensive type, such as plastic, fiber or the like, and which can be easily molded or die-cast in the desired form with a relatively large cavity or hollow space 2 provided therein and extending from near the bottom to near the top thereof and terminating at the top in an enlarged hand opening 3 at the rear of the head portion of the animal figure, said hand opening being of sufficient size to freely admit a child's hand therein.

Disposed within the body member 1 in a generally upright position is an elongated operating member 4 having a columnar form and suitably supported within the body member so that its lower end projects below the bottom of the body member and its upper end lies opposite the hand opening 3 so as to be easily accessible to the operator's hand as best shown in FIGS. 1 and 2. The operating member 4 preferably is made of resilient material, such as steel, bronze, nylon or the like, and is flexible in opposite directions in at least one vertical plane. For convenience and simplicity, the member 4 may have the form of a normally straight length of rod or heavy wire of circular cross-section, and is preferably tapered inwardly from its opposite ends toward the mid-position thereof so as to have greater flexibility at the mid-portion than at either end.

Fixed to the operating member 4 and located within the body member 1 near the lower end thereof is a weight 5 which improves the jumping or hopping action of the toy when it is essentially made of light-weight material, said weight being formed of lead or other suitable heavy substance. At the extreme lower end of the operating member 4, below the bottom of the body member 1, the operating member is preferably provided with a foot-piece 6 suitably anchored or fixed thereto. The foot-piece 6 is formed of a non-skid material, at least in part, such as rubber, cork, or the like, and has a substantially flat bottom face 7 from which a flat rear face 8 extends in an upwardly and rearwardly inclined direction so as to assist in controlling the direction of jumping or hopping movement of the toy responsive to action of the operating member 4, as will be hereinafter more fully apparent.

Near the lower and upper ends of the operating member 4, it is provided with suitable supporting arms 9 and 10, respectively, which are engageable with the body member 1, with the arms 10 having a freely sliding motion in the walls of the body member so as to allow the operating member 4 to freely flex and bow rearwardly and forwardly as illustrated in solid and broken lines, respectively, in FIG. 3, when a downward pressure is imposed on the upper end of the operating member 4 and then quickly released, while the foot-piece 6 is initially engaged with the ground or floor. In order to further contribute to the guiding of the toy in a forward direction when it is operated, a pair of laterally spaced and forwardly extended resilient arms 11 are mounted on the operating member 4 near the lower end thereof, with the arms 11 fixed to the operating member as by a crossbar 12, and with the arms 11 being located exteriorly of the body member 1 at the bottom thereof and extending forwardly between the hind feet of the animal figure so as to freely engage the ground or floor when the operating member 4 springs forwardly to the broken line position depicted in FIG. 3.

At the upper end of the operating member 4, it is preferably provided with a thumb ring or loop 13 and a cross-bar 14 below the same to be engaged by the fingers of the operator's hand at best depicted in FIG. 2. The operating member 4 is of such length that the thumb ring 13 and finger bar 14 normally are at a height to be comfortably engaged by the operator's hand when the forearm of the operator is extended approximately parallel or slightly downwardly inclined to the ground or floor and the hand is inserted palm upwards through the hand opening 3 at the upper rear portion of the body member 1, and the thumb is loosely inserted in the ring 13 to about the depth of the base of the thumb-nail and the index and middle fingers are extended above the cross-bar 14 on opposite sides, respectively, of the upright rod or wire 4, as indicated in FIGS. 1 and 2.

To operate the toy after the child has grasped the operating member 4 in the manner just described, a downward pressure is initially exerted by the thumb on the upper end of the member 4 so as to cause it to flex and bow rearwardly within the cavity 2 of the body member 1 until it assumes the full line position shown in FIG. 3, as permitted and facilitated by the bevelled or inclined face 8 on the foot-piece 6 which rests on the ground or floor. Thereafter, the downward pressure must be suddenly or quickly released, causing the member 4 to rapidly reflex and snap forwardly to the broken line position in FIG. 3, which causes the entire toy to jump or hop upwardly and forwardly. By repeating this action in properly timed sequence of intermittent applications of downward pressure upon the upper end of the member 4, simultaneously coordinated with a forward walking motion of the operator, the toy will advance with a series of hops or jumps in an amusing and animal-like manner as generally indicated in FIG. 1. During the hopping or jumping action, the thumb of the operator must be relaxed sufficiently to avoid material interference with the free movements of the toy under its own impulses, but can be utilized to assist in steering the toy in a more-or-less straight line or in a slightly curved path, aided by the forwardly extended and laterally spaced arms 11 at the base of the toy.

A reasonably flat surface allows the best performance of my toy when operated thereon. It should be further understood that the finger cross-bar 14 preferably serves as a rest or stop for the fingers without interfering with the flexing of the operating member 4 during operation of the toy. The cross-bar is not used to lift the toy off the ground or floor, since the hopping or jumping action of the toy is spontaneous and is attributed entirely to the free flexing and reflexing of the member 4 responsive to downward pressure thereon and quick release of such pressure.

While the specific details of my invention have been herein shown and described, it is not confined thereto as changes and alterations may be made without departing from the spirit thereof as defined in the appended claims.

I claim:
1. An animated toy of the classs described, comprising a body member simulating the appearance of an animal, an elongated flexible and resilient operating means normally disposed in a generally upright position within the body member and supported thereby, the lower end of said operating means extending beyond the bottom of the body member for engagement with the ground or a floor, and the upper end of said operating means terminating within the body member near the upper end of the latter and accessible from the rear of the body member to the hand of an operator for imparting downward pressure by a digit on the upper end of the operating means to cause the same to flex in one direction with a bowing action throughout substantially its entire length and to reflex throughout substantially its entire length in the opposite direction when the pressure on the operating means is quickly released and thus imparts a hopping motion to the body in the general direction of the reflexing action of the operating means.

2. An animated toy as defined in claim 1, wherein the extended bottom end of the operating means is provided with a non-skid foot-piece.

3. An animated toy as defined in claim 1, wherein the extended bottom end of the operating means is provided with a non-skid foot-piece, said foot-piece having a flat face formed on the rear thereof and inclined rearwardly and upwardly from the base thereof.

4. An animated toy as defined in claim 1, wherein the extended bottom end of the operating means is provided with a non-skid foot-piece, and a weight member mounted on the operating means near the lower end thereof.

5. An animated toy as defined in claim 1, wherein the operating means has the form of a columnar element which is flexible in opposite directions in at least one vertical plane.

6. An animated toy as defined in claim 1, wherein the operating means has the form of a rod of substantially circular cross-section.

7. An animated toy as defined in claim 1, wherein the operating means has the form of a rod of substantially circular cros-section, said rod being inwardly tapered from the upper and lower ends toward its mid-portion so as to be of smaller diameter intermediate its ends.

8. An animated toy as defined in claim 1, wherein the upper end of the operating means is provided with a loop to receive the thumb of the operator.

9. An animated toy as defined in claim 1, wherein the upper end of the operating means is provided with a loop to receive the thumb of the operator, and a cross bar extended laterally from the operating means at opposite sides thereof so as to be engageable therebeneath by the fingers of the operator's hand.

10. An animated toy as defined in claim 1, wherein the lower end of the operating means is provided with guide means to aid in controlling the direction of hopping motion of the toy.

11. An animated toy as defined in claim 1, wherein the lower end of the operating means is provided with guide means to aid in controlling the direction of hopping motion of the toy, said guide means including a pair of laterally spaced and forwardly extended guide arms.

12. An animated toy as defined in claim 1, wherein the operating means is provided with supporting arms near the upper and lower ends thereof for supporting engagement with the body.

References Cited by the Examiner
UNITED STATES PATENTS
1,167,405   1/16   Holmberg _____ 46—129
1,649,072   11/27  McAllaster _____ 46—123

RICHARD C. PINKHAM, *Primary Examiner.*